(12) United States Patent
Bannon et al.

(10) Patent No.: US 6,725,739 B2
(45) Date of Patent: Apr. 27, 2004

(54) ROTARY TILT MECHANISM

(75) Inventors: Sean A Bannon, Bloomfield Hills, MI (US); William A Jolley, Waterford, MI (US); Benjamin S Basa, Jr., Grand Blanc, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 256 days.

(21) Appl. No.: 10/034,209

(22) Filed: Dec. 28, 2001

(65) Prior Publication Data

US 2003/0121352 A1 Jul. 3, 2003

(51) Int. Cl.[7] ................................................. B62D 1/18
(52) U.S. Cl. .................... 74/493; 280/775; 403/299; 411/553
(58) Field of Search ................... 74/492, 493, 495; 280/775, 779; 403/299, 343, 348, 349, 350; 411/418, 437, 349, 549, 550, 551, 552, 553

(56) References Cited

U.S. PATENT DOCUMENTS

| | | | | | |
|---|---|---|---|---|---|
| 1,096,763 | A | * | 5/1914 | Smith | 411/418 |
| 3,837,753 | A | * | 9/1974 | Weiste et al. | 403/343 |
| 4,781,507 | A | * | 11/1988 | Duenas | 411/433 |
| 6,167,777 | B1 | * | 1/2001 | Snell | 74/493 |

* cited by examiner

Primary Examiner—Thomas R. Hannon
Assistant Examiner—Timothy McAnulty
(74) Attorney, Agent, or Firm—Donald J. Wallace

(57) ABSTRACT

A locking mechanism for a tiltable steering column includes a rod disposed within and selectively actuable along a longitudinal axis of a sleeve. A biasing member biased the rod into a locked position with the sleeve, the biasing member having a first end coupled to a mounting portion extending from the sleeve. A collar is arranged around a portion of the sleeve, the collar includes a dog tangentially extending from an outer wall of the collar and a groove portion formed between the outer wall and the dog for receiving the second end of the biasing member.

15 Claims, 6 Drawing Sheets

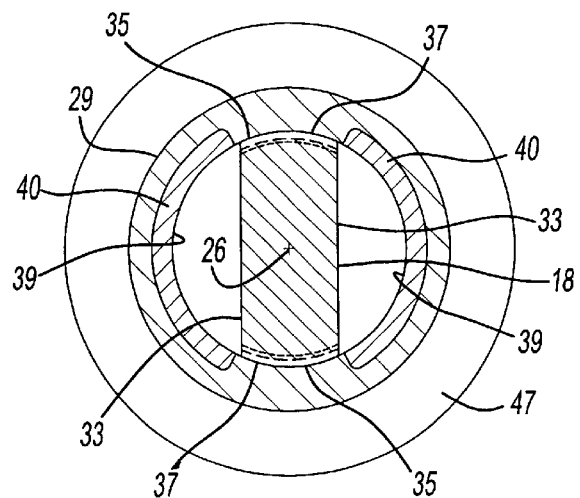
Fig-4
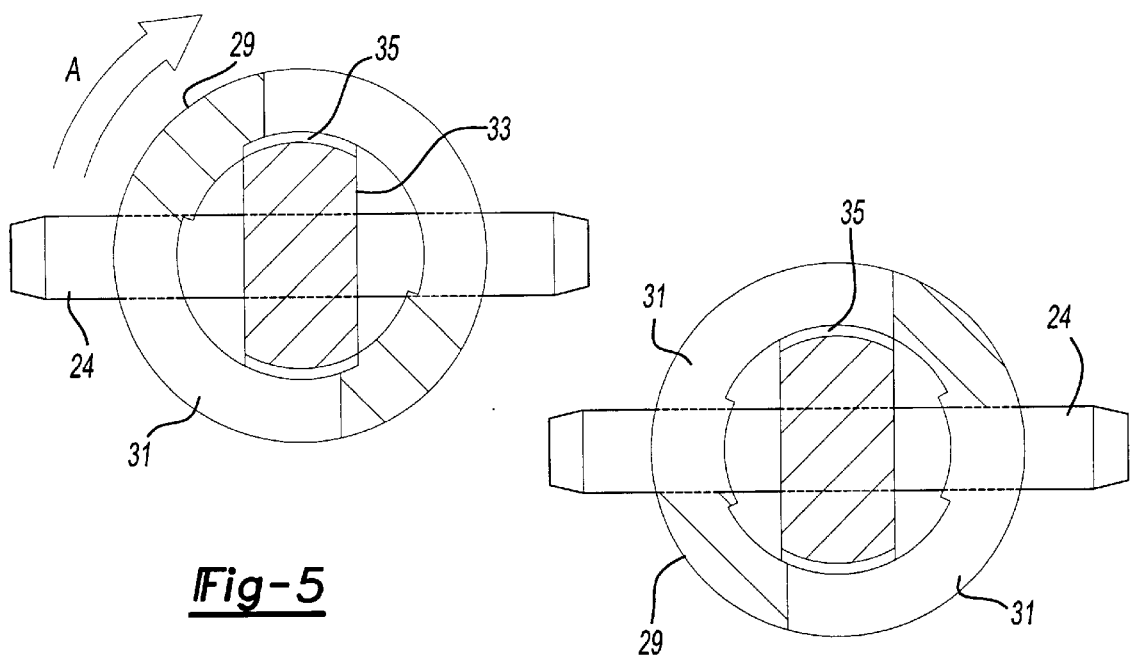
Fig-5
Fig-6

ROTARY TILT MECHANISM

FIELD OF THE INVENTION

The present invention relates to tiltable steering column assemblies for motor vehicles, and more particularly to a locking mechanism for a tiltable steering column.

BACKGROUND OF THE INVENTION

Vehicle steering columns are often provided with a tiltable component that enables the steering wheel to be set at varying degrees of tilt according to the desires and needs of different persons that might have occasion to drive a vehicle. Typically, a manually operable lock mechanism is provided for retaining the steering wheel component in a selected position of tilt adjustment.

In one conventional rotary tilt mechanism, an externally threaded rod is provided including pivot connections incorporated on opposite ends. A sleeve encircles the rod and is biased into a locking relationship with the rod by a biasing member. A lever, which is incorporated on the steering column, may be actuated to overcome the bias. Actuation of the lever allows the rod to move into an unlocked position, whereby the rod may slidably translate within the sleeve toward a desired position of tilt. Once the steering wheel is pivoted into the desired position, the lever is disengaged and the sleeve is biased into a locked relationship with the rod.

SUMMARY OF THE INVENTION

The present invention provides a locking mechanism for a tiltable steering column having a pivot connection between upper and lower steering column members, whereby the steering wheel can be tiltably adjusted around the pivot connection to selected positions of adjustment. The locking mechanism includes a rod disposed within a sleeve. The rod is selectively actuable along a longitudinal axis of the sleeve. A biasing member biases the rod into a locked position with the sleeve. The biasing member includes a first end coupled to a first mounting portion extending from the sleeve. A collar is arranged around a portion of the sleeve. The collar includes a second mounting portion extending from an outer wall thereof for receiving the second end of the biasing member.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 4 is a transverse sectional view taken along line 4—4 of FIG. 3.

FIG. 5 is a transverse sectional view taken along line 5—5 of FIG. 3.

FIG. 6 is the sectional view of FIG. 5, showing the locking components in a different position of adjustment.

DETAILED DESCRIPTION OF THE PREFERRED EMBODIMENTS

The following description of the preferred embodiment(s) is merely exemplary in nature and is in no way intended to limit the invention, its application, or uses.

Figure 1:
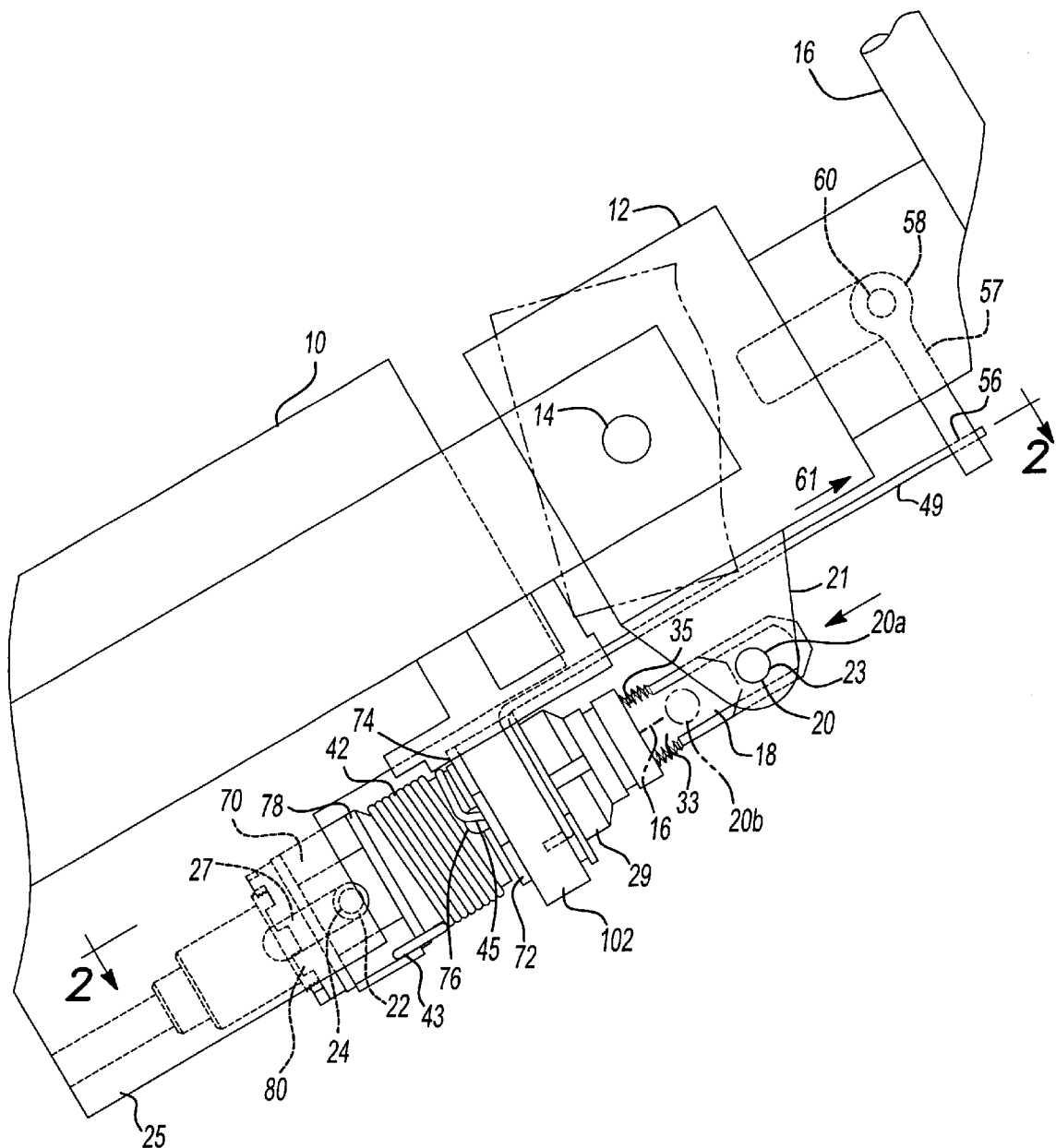
FIG. 1 is a fragmentary side elevational view of a vehicle steering column having a tilt lock mechanism of the present invention installed thereon.

Referring to FIG. 1, there is shown a vehicle steering column assembly that includes a lower stationary column member 10 and an upper tiltable steering column member 12 connected together by a pivot connection 14, whereby column member 12 is capable of tilting adjustment around the pivot connection axis. A steering wheel 16 is located at the upper end of column member 12. The interior spaces within column members 10 and 12 are occupied by rotary shafts that are connected by a universal joint centered on the axis of pivot connection 14. Steering wheel 16 is attached to the shaft located within column member 12.

The present invention is concerned with a locking mechanism for retaining column member 12 in selected positions of tilt adjustment. In FIG. 1, dashed lines show the downward limit of tilt adjustment for column member 12. Column member 12 can be tilted upwardly from the full line position to a similar extent. Typically, column member 12 can be tiltably adjusted downwardly from its full line position by approximately thirteen degrees, and upwardly from its full line position by a similar number of degrees.

The locking mechanism for retaining column member 12 in selected positions of tilt adjustment (up or down) includes an externally threaded rod 18 having a first pivot connection 20 to column member 12 and a second pivot connection 22 to column member 10. By adjusting the location of the pivot connection 22 on the longitudinal axis 26 of rod 18 it is possible to vary the effective length of the rod 18 and the tilt angle of column member 12 around the axis of pivot connection 14.

Pivot connection 20 includes two parallel ears 21 extending downwardly from column member 12, and a pivot shaft 23 extending transversely through ears 21 and the upper end of rod 18. Pivot connection 22 includes a pivot shaft 24 extending between two parallel ears 25 depending from column member 10. Pivot connection 22 further includes an axial slot 27 formed in rod 18, such that shaft 24 extends transversely through the slot. Rod 18 can rotate on shaft 24, and also slide longitudinally on the shaft 24 to vary the effective length of the rod, i.e. the distance between pivot connections 22 and 20.

Rod 18 is longitudinally stabilized on shaft 24 by means of a sleeve 29 that encircles the rod 18. The sleeve 29 has two arcuate circumferential slots 31 engaging shaft 24, whereby the sleeve 29 can be rotated on rod 18 a limited distance around rod axis 26. In the illustrated apparatus, slots 31 permit sleeve 29 to rotate approximately ninety degrees around rod axis 26. FIG. 5 shows sleeve 29 at one limit of the sleeve rotational movement. FIG. 6 shows sleeve 29 at the other limit of the rotational movement.

Rod 18 has two parallel flat side surfaces 33 extending the full length of the rod 18, and two arcuate serrated surfaces 35 connecting flat surfaces 33. The serrations form diametrically opposed external teeth on the rod 18. The serrated arcuate surfaces 35 are centered on rod axis 24. Flat surfaces 33 span through the serrated surfaces 35 such that serrated surfaces 35 do not overhang at an angle with respect to flat surfaces 33.

Sleeve 29 has two internal arcuate serrated surfaces 37 separated by two arcuate smooth surfaces 39. The internal teeth formed by serrated surfaces 37 have the same pitch as the external teeth 35 on rod 18, so that when sleeve 29 is rotated to the position depicted in FIGS. 4 and 5 the internal teeth on the sleeve mesh with the external teeth on rod 18.

When sleeve 29 is rotated to the position depicted in FIG. 4, the meshed teeth prevent axial movement of rod 18 within sleeve 29. Slots 31 in the sleeve are in a circumferential plane that intersects the axial plane of slot 27 in rod 18, whereby sleeve 29 prevents the rod from movement relative to pivot shaft 24.

When sleeve 29 is rotated in the direction of arrow A from the position depicted in FIG. 5 to the position depicted in FIG. 6, the internal teeth in sleeve 29 are out of mesh with the external teeth on rod 18. Rod 18 can thereby be moved longitudinally (on rod axis 26) along shaft 24 a limited distance dictated by the length of slot 27. Such movement of the rod 18 can be used to move pivot shaft 23 around pivot connection 14, thereby adjusting the tilt angle of column member 12.

Referring to FIG. 1, pivot connection 20 is shown in two limit positions, i.e., a limit position 20a, wherein rod 18 is advanced upwardly to tilt column member 12 upwardly; and a second limit position 20b, wherein rod 18 is retracted downwardly to tilt column member downwardly. Slot 27 limits the rod 18 movement. Rod 18 can have various adjusted positions between limiting positions 20a and 20b. The number of discrete rod positions is determined by the pitch distance for the teeth on rod 18 and sleeve 29.

During longitudinal movement of rod 18 within sleeve 29, internal arcuate surfaces 39 on the sleeve act as bearings to maintain the rod in a centered position relative to the sleeve. For manufacturing reasons, each smooth arcuate surface 39 is formed by an arcuate insert member 40 installed within sleeve 29 after the sleeve has been machined to form the diametrically opposed serrated surfaces 37. The exposed arcuate surfaces 39, formed by inserts 40, have a diameter that is the same as the diameter of the arcuate toothed surfaces 35 on rod 18. When sleeve 29 is in the position depicted in FIG. 6, the arcuate smooth surfaces will function as bearing surfaces to maintain the sleeve 29 in a centered position on rod 18; i.e., the axis of sleeve 29 is coincident with the rod axis 26. This is beneficial in that the rod 18 can be moved axially within the sleeve 29 without binding or cocking in the sleeve.

Each arcuate insert 40 extends from the right end of sleeve 29 about one half the sleeve length. Inserts 40 are not visible in FIGS. 5 and 6 because the viewing plane for FIG. 5 is beyond the ends of the inserts.

Figure 2:
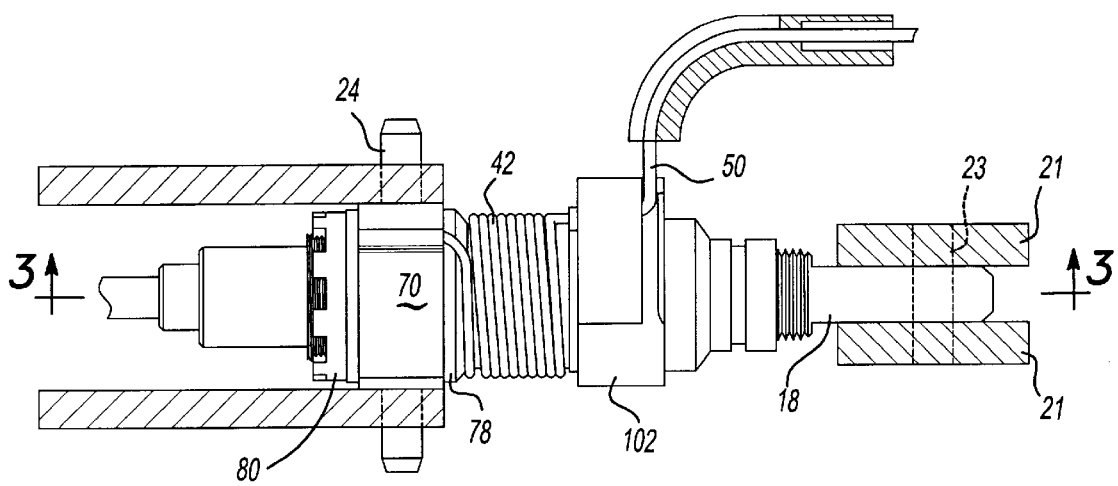
FIG. 2 is a fragmentary sectional view taken along line 2—2 of FIG. 1.
Figure 3:
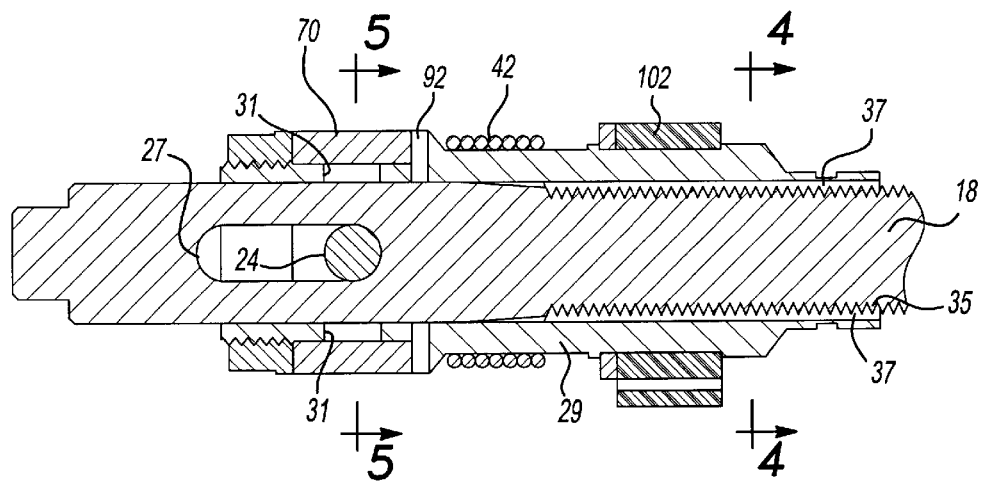
FIG. 3 is a sectional view taken along line 3—3 of FIG. 2.

Sleeve 29 is rotated to the position depicted in FIG. 5 by a torsion coil spring 42. As shown in FIGS. 1 and 2, end 43 of the torsion spring is anchored to collar or trunion 70. The other end 45 of the torsion spring extends into a small hole 100 formed in an externally mounted snap ring 72. Snap ring 72 is bounded on a first side circumferential wall 74. A notch (not specifically shown) is incorporated in circumferential wall 76 to allow end 45 of torsion spring 42 to gain access to snap ring 72. The torsion coil spring 42 is wound so as to exert a counterclockwise biasing force on sleeve 29, as the sleeve is viewed in FIG. 4.

With continued reference to FIGS. 1, 2 and 7, trunion 70 will be explained in greater detail. Trunion 70 is bounded on a first end by thrust wall 78 and on a second end by castle nut 80. Trunion 70 includes diametrically opposed bores 82 incorporated therein. The diameter of the bores 82 is preferably generally equal to the width of pivot shaft 24, whereby an interference fit is provided therebetween. Trunion 70 further includes an ear or dog 84 having a wall portion 86 tangentially extending from an outer wall 88 and forming a groove portion 90 between the outer wall 88 and the tangentially extending wall 86. The groove portion 90 anchors the first end of the torsion spring 43 onto trunion 70. The rotational force transmitted by torsion spring 42 onto trunion 70 is translated to pivot shaft 24. In this manner, the interface fit between pivot shaft 24 and the diametrically opposed bores 82, precludes any rotational biasing force to be absorbed by the walls of slot 27. For additional support, the wall thickness of the trunion 70 near bores 82 is increased.

During assembly, trunion 70 is advanced onto sleeve 29 until contacting thrust wall 92. Upon engaging ear 84 of trunion 70 with second end 43 of torsion spring 42, the trunion 70 is influenced in a clockwise direction as viewed in FIG. 5. Castle nut 80 is threadably advanced onto threads 94 of sleeve 29 to secure trunion 70 in a location revealing a continuous passage through the diametrically opposed bores 82 and the slot 27. An adhesive, such as LOCTITE™, is applied to the contact wall of castle nut 80 to encourage a sound bond. Pivot shaft 24 is suitably inserted through the passage and castle nut 80 is backed off to allow for lash adjustment.

The cooperation of castle nut 80 and thrust wall 92 secure trunion 70 in a position aligning bores 82, slot 27 and slot 31 to allow pivot shaft 24 to be readily inserted during assembly through the passage without the need to remove a "dummy pin", which would otherwise provide necessary alignment.

Figure 7:
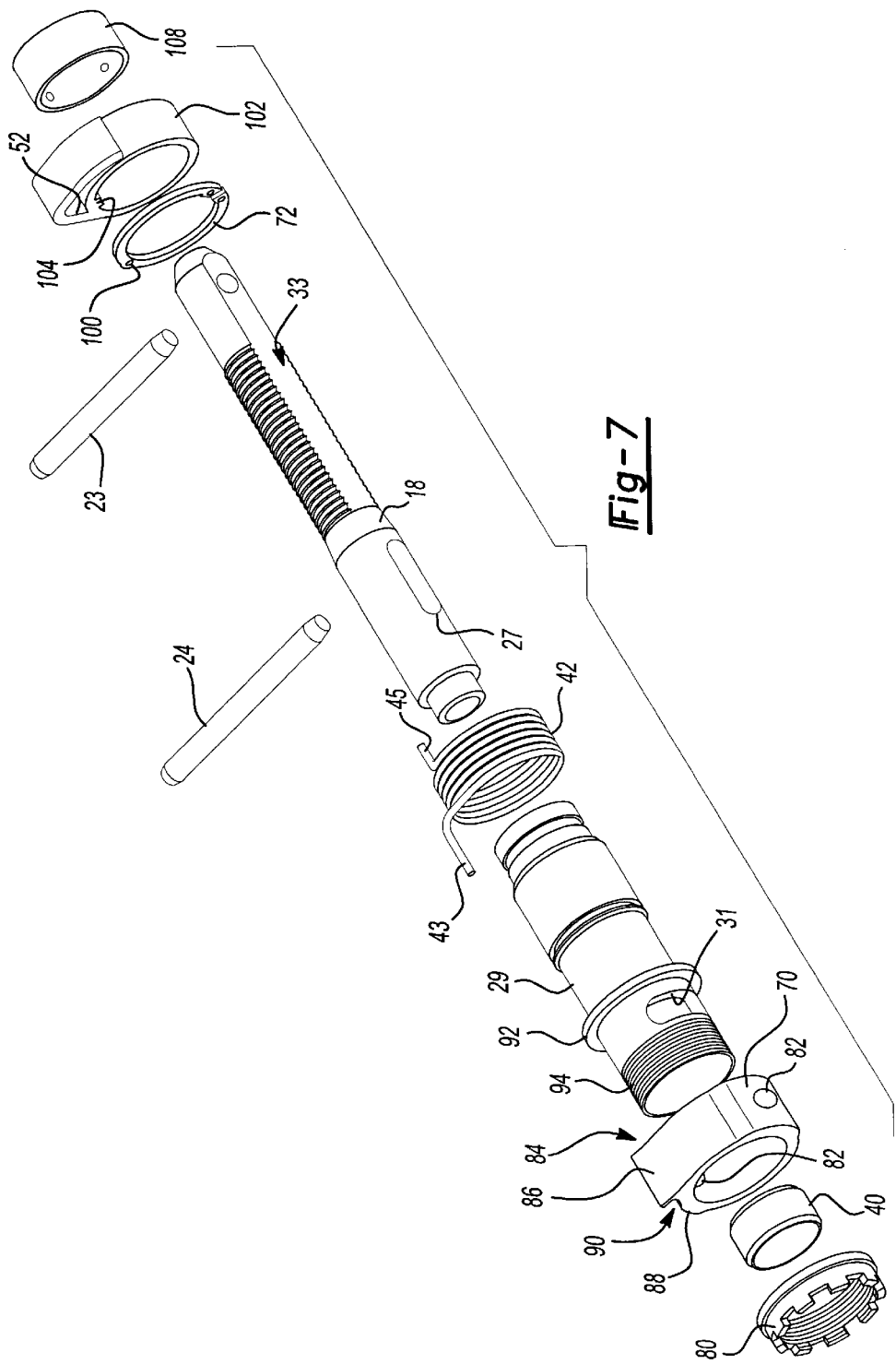
FIG. 7 is an exploded perspective view of the rotary tilt mechanism of the present invention.
Figure 8:
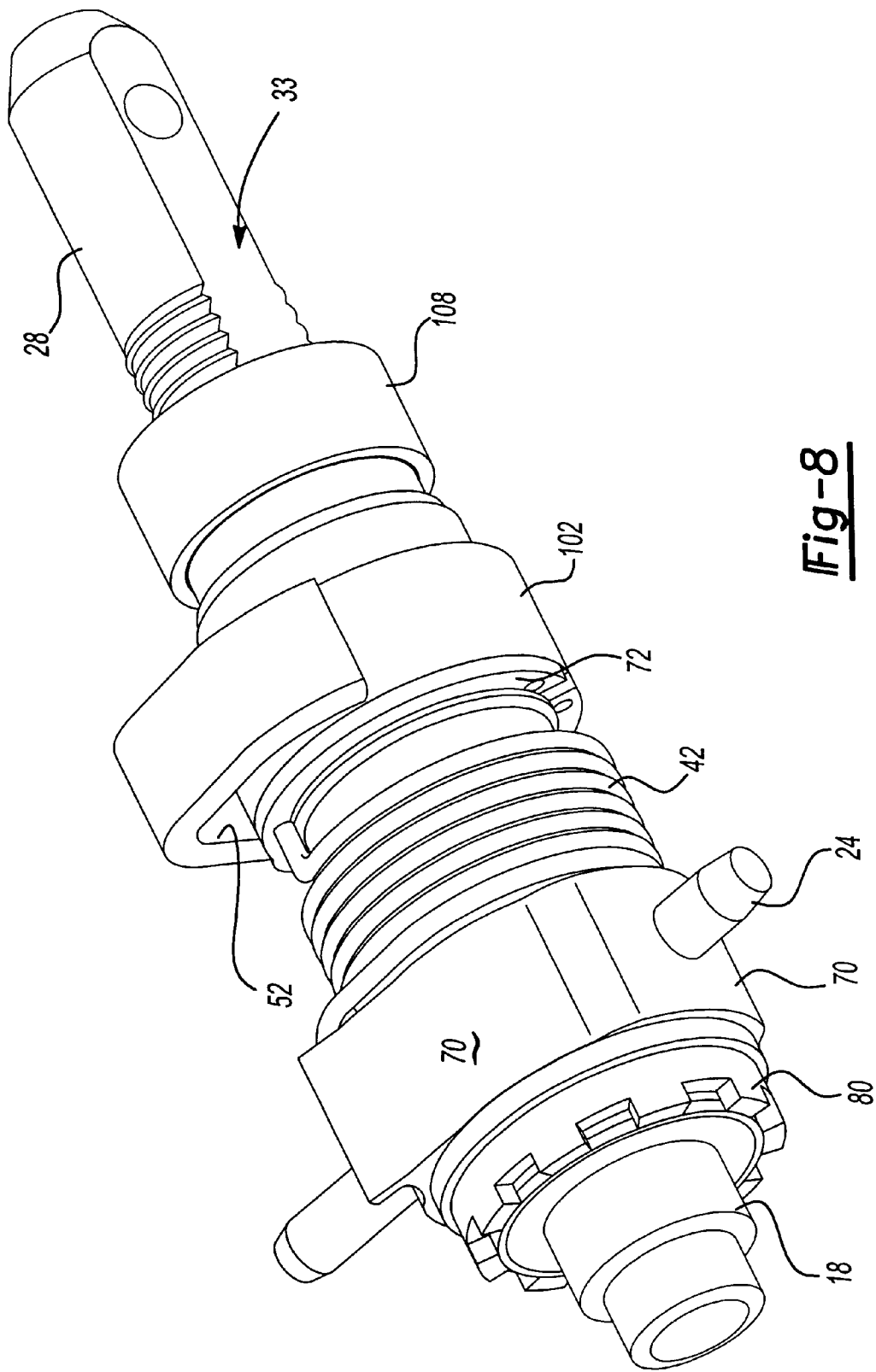
FIG. 8 is a perspective view of the rotary tilt mechanism of the present invention.
Figure 9:
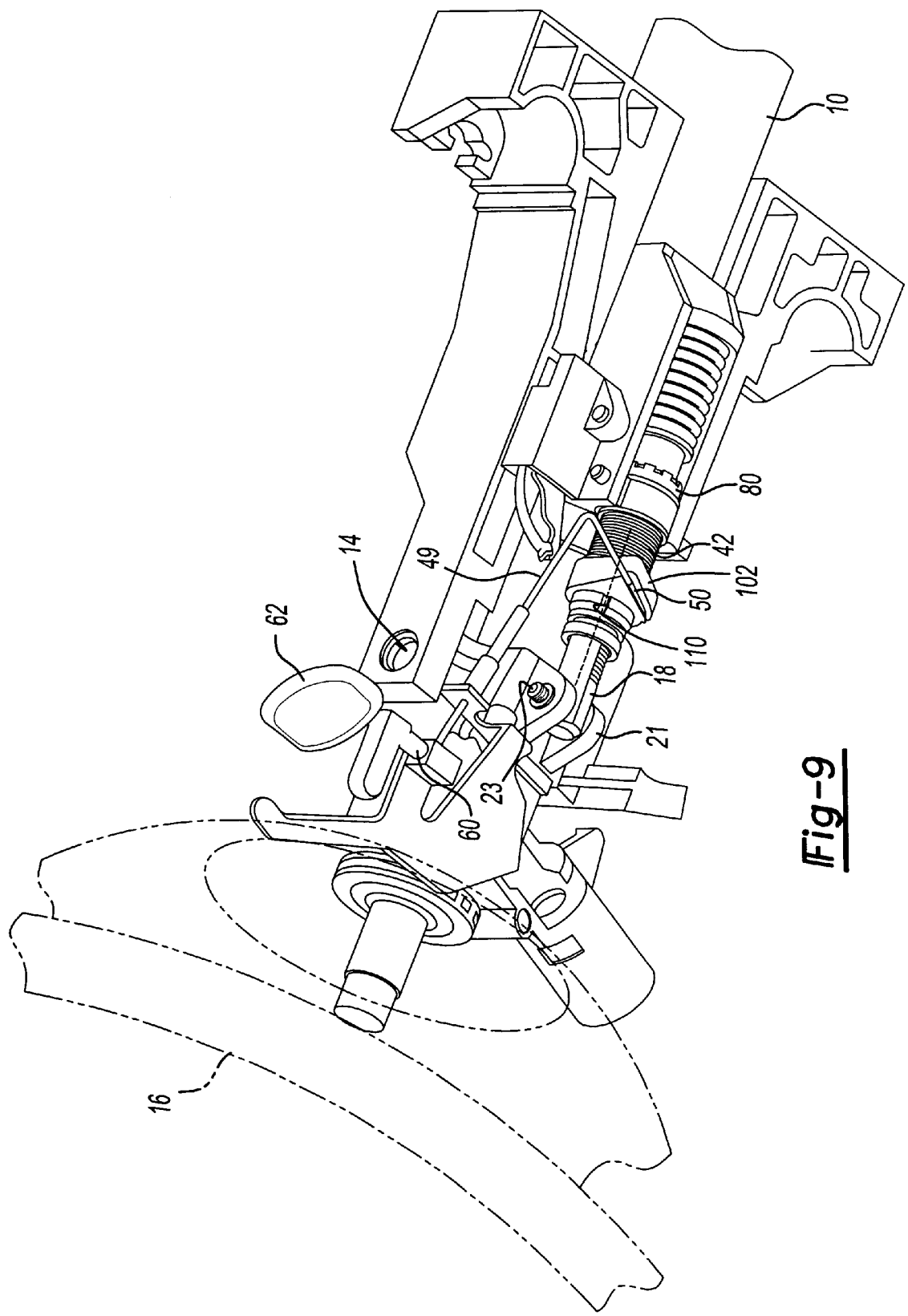
FIG. 9 is a bottom perspective view of the rotary tilt mechanism shown installed within a tilt lock vehicle steering column according to the present invention.

With continued reference to FIG. 7 and additional reference to FIGS. 8 and 9, sleeve 29 is rotated to the position depicted in FIG. 6 by a manual cable means, referenced generally by numeral 49. Cable means includes a flexible wire (small diameter cable) 50 having one end anchored at 52 to hook sleeve 102. Hook sleeve 102 has a tooth engaging a retaining channel 110 formed on sleeve 29 to prevent relative rotation between the hook sleeve 102 and sleeve 29. An end collar 108 is disposed on the ends of sleeve 29. The flexible wire 50 extends partially around the grooved flange on sleeve 29, and then around an arcuate guide 54 that is suitably attached to the undersurface of column member 10.

As shown in FIG. 1, cable means 49 extends rightwardly from hook collar 102 to an anchored connection 56 with an arm 57. Arm 57 has a hub portion 58 that is rotatable on a shaft 60 extending laterally from column member 12. The outer end of shaft 60 mounts a manually depressible handle 62.

Manual depression of handle 62 around the shaft 60 axis moves wire 50 in the arrow 61 direction (FIG. 1), such that the wire 50 rotates sleeve 29 in a clockwise direction as viewed in FIG. 5. When handle 62 is manually depressed, sleeve 29 is rotated from the position depicted in FIG. 5 to the position depicted in FIG. 6. When the manual pressure on handle 62 is removed, torsion spring 42 rotates sleeve 29 from the position shown in FIG. 6 to the position shown in FIG. 5.

FIG. 5 depicts the normal position of sleeve 29, wherein the external teeth on rod 18 are in mesh with the internal teeth on sleeve 29. The sleeve is locked to rod 18 so that the rod 18 forms a rigid connection between shaft 23 on column member 12 and shaft 24 on column member 10. Column member 12 is thereby retained in a fixed position relative to column member 10.

In order to change the tilt setting of column member 12 (up or down around pivot connection 14) handle 62 is manually depressed to rotate sleeve 29 from the position depicted in FIG. 5 to the position depicted in FIG. 6. The internal teeth on sleeve 29 are thereby moved out of mesh with the external teeth on rod 18, as shown in FIG. 7. Column member 12 can then be freely rotated around the axis of pivot connection 14 to any desired tilted position within limits.

When column member 12 is moved around the axis of pivot connection 14, rod 18 slides freely along rod axis 26 to establish a new relation between slot 27 and shaft 24. The effective length of rod 18 between shafts 23 and 24 is changed in accordance with the movement of column member 12. With column member 12 in the new (desired) position, manual pressure on handle 62 is released, such that torsion coil spring 42 returns sleeve 29 to the position depicted in FIGS. 4 and 5. The internal teeth on sleeve 29 move into mesh with the external teeth on rod 18, such that rod 28 is prevented from longitudinal axial movement along rod axis 26. Sleeve 29 serves as a rigid connector between rod 18 and shaft 24.

When in the locked position, the internal teeth on sleeve 29 cannot inadvertently disengage from the external teeth on rod 18. As shown in FIG. 4, rod 18 completely fills the vertical space within sleeve 29. The sleeve 29 cannot vibrate in the vertical plane so as to disengage the meshed teeth.

In any locked position, a relatively large number of teeth are in mesh. Rod 18 has teeth on both its upper surface and its lower surface. Also, the rod 18 and sleeve 29 have large cross section walls presented to the expected load forces (acting primarily parallel to rod axis 26). This arrangement also provides a high degree of adjustment with many tilt positions. In one embodiment, this design provides thirteen positions of adjustment.

The illustrated locking mechanism can be constructed as a relatively small size assembly without greatly reducing its strength or ability to handle the expected load forces. As shown in the drawings, the locking mechanism is located externally relative to column members 10 and 12, such that the locking mechanism can be modularized as a separate assembly capable of interchangeable use with a range of different steering columns without extensive tooling changes or structural modifications in the locking mechanism or steering column.

The drawings show rod 18 as having an adjustment slot 27 and sleeve 29 cooperable with shaft 24 on the stationary column member 10. However, the adjustment slot 27 and sleeve 29 could be relocated so as to interact with shaft 23 on movable column member 12.

Within the broader scope of the invention, it is believed that the illustrated locking mechanism could be used with movable and stationary members other than the steering column members.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A locking mechanism for a tiltable steering column including an upper steering wheel column member, a lower stationary steering column member, a pivot connection between the upper and lower column members, whereby a steering wheel can be tiltably adjusted around the pivot connection to selected positions of adjustment, the locking mechanism including;

a rod disposed within a sleeve and selectively actuable along a longitudinal axis of the sleeve;

a biasing member for biasing the rod into a locked position with the sleeve, the biasing member having a first end coupled to a first mounting portion extending from the sleeve;

a collar arranged around a portion of the sleeve, the collar including a second mounting portion extending from an outer wall thereof for receiving the second end of the biasing member.

2. The locking mechanism of claim 1, wherein the collar includes diametrically opposed bores formed thereon for receiving a mounting shaft therethrough.

3. The locking mechanism of claim 2, wherein the diametrically opposed bores provide an interference fit with the mounting shaft.

4. The locking mechanism of claim 3, wherein the collar has increased wall thickness around the diametrically opposed bores.

5. The locking mechanism of claim 4, wherein the biasing member transmits a load onto a groove portion of the collar, the collar transferring the load onto the mounting shaft.

6. The locking mechanism of claim 1, wherein the mounting portion extending from the sleeve includes a snap ring journalled around the sleeve.

7. The locking mechanism of claim 1, wherein the second mounting portion includes a groove portion formed between an outer wall of the collar and a dog tangentially extending from the outer wall of the collar.

8. A locking mechanism for a tiltable steering column including an upper steering wheel column member, a lower stationary steering column member, a pivot connection between the upper and lower column members, whereby a steering wheel can be tiltably adjusted around the pivot connection to selected positions of adjustment, the locking mechanism including;

a first member selectively movable in relation to a second member;

a biasing member for biasing the first and second members toward a locked position wherein the first member is precluded from moving in relation to the second member;

a retaining member engaged to one of the first and second members, the retaining member having an ear extending therefrom and in engagement with a first end of the biasing member; and a shaft extending through the retaining member, the shaft carrying a biasing force produced by one of a first and second end of the biasing member.

9. The locking mechanism of claim 8, wherein the retaining member further includes diametrically opposed bores formed thereon for receiving the shaft therethrough.

10. The locking mechanism of claim 9, wherein the outer diameter of the shaft is substantially equal to the diameter of the diametrically opposed bores.

11. The locking mechanism of claim 10, wherein the shaft provides an interference fit with the diametrically opposed bores.

12. The locking mechanism of claim 9, wherein the locking mechanism has increased thickness proximate to the diametrically opposed bores.

13. The locking mechanism of claim 8, wherein the ear extends tangentially from an outer wall of the retaining member.

14. The locking mechanism of claim 8, wherein the one of the first and second members is a cylindrical shaft, the locking mechanism journalled therearound.

15. A locking mechanism for a tiltable steering column including an upper steering wheel column member, a lower stationary steering column member, a pivot connection between the upper and lower column members, whereby a steering wheel can be tiltably adjusted around the pivot connection to selected positions of adjustment, the locking mechanism including;

a rod disposed within a sleeve and selectively actuable along a longitudinal axis of the sleeve;

a biasing member for biasing the rod into a locked position with the sleeve, the biasing member having a first end coupled to a mounting portion extending from the sleeve;

a collar arranged around a portion of the sleeve, the collar including a dog tangentially extending from an outer wall of the collar and a groove portion formed between the outer wall and the dog for receiving the second end of the biasing member.

* * * * *